(12) United States Patent
Goodman et al.

(10) Patent No.: US 9,811,875 B2
(45) Date of Patent: Nov. 7, 2017

(54) TEXTURE STATE CACHE

(71) Applicant: Apple Inc., Cupertino, CA (US)

(72) Inventors: Benjiman L. Goodman, Cedar Park, TX (US); Adam T. Moerschell, San Jose, CA (US); James S. Blomgren, Houston, TX (US)

(73) Assignee: Apple Inc., Cupertino, CA (US)

( * ) Notice: Subject to any disclaimer, the term of this patent is extended or adjusted under 35 U.S.C. 154(b) by 26 days.

(21) Appl. No.: 14/482,828

(22) Filed: Sep. 10, 2014

(65) Prior Publication Data

US 2016/0071232 A1 Mar. 10, 2016

(51) Int. Cl.
*G09G 5/00* (2006.01)
*G06T 1/60* (2006.01)
*G06T 15/04* (2011.01)

(52) U.S. Cl.
CPC ............... *G06T 1/60* (2013.01); *G06T 15/04* (2013.01)

(58) Field of Classification Search
CPC .............................. G06T 15/04; G06T 11/001
USPC .......................................................... 345/582
See application file for complete search history.

(56) References Cited

U.S. PATENT DOCUMENTS

| | | | | |
|---|---|---|---|---|
| 5,586,286 A | * | 12/1996 | Santeler ................ | G06F 9/3869 365/193 |
| 6,972,769 B1 | * | 12/2005 | Nebeker ............... | G06T 15/005 345/552 |
| 6,995,767 B1 | * | 2/2006 | Donovan ................ | G06T 15/04 345/428 |
| 7,948,498 B1 | * | 5/2011 | Minkin ..................... | G06T 1/60 345/552 |
| 8,421,821 B2 | | 4/2013 | Nystad et al. | |
| 2006/0179231 A1 | * | 8/2006 | Briggs ................ | G06F 12/0897 711/136 |
| 2008/0211823 A1 | * | 9/2008 | Chung .................... | G06T 15/04 345/552 |
| 2011/0069076 A1 | * | 3/2011 | Lindholm ............. | G06T 11/001 345/552 |
| 2013/0169651 A1 | * | 7/2013 | Minkin ..................... | G06T 1/20 345/501 |
| 2014/0173258 A1 | * | 6/2014 | Fahs ...................... | G06F 9/3887 712/225 |

(Continued)

OTHER PUBLICATIONS

Stuart Oberman, "GPUs: Applicants of Computer Arithmetric in 3D Graphics", Jul. 10, 2006.*

(Continued)

*Primary Examiner* — Jin Ge
(74) *Attorney, Agent, or Firm* — Meyertons, Hood, Kivlin, Kowert & Goetzel, P.C.

(57) ABSTRACT

Techniques are disclosed relating to a cache configured to store state information for texture mapping. In one embodiment, a texture state cache includes a plurality of entries configured to store state information relating to one or more stored textures. In this embodiment, the texture state cache also includes texture processing circuitry configured to retrieve state information for one of the stored textures from one of the entries in the texture state cache and determine pixel attributes based on the texture and the retrieved state information. The state information may include texture state information and sampler state information, in some embodiments. The texture state cache may allow for reduced rending times and power consumption, in some embodiments.

18 Claims, 5 Drawing Sheets

(56) References Cited

U.S. PATENT DOCUMENTS

2014/0240329 A1\* 8/2014 Tarjan ................... G06T 15/04
345/520
2014/0337389 A1\* 11/2014 Ricketts ............ G06F 17/30292
707/803

OTHER PUBLICATIONS

Michael Doggett, "Texture Caches," preprint of an article that appears in IEEE Micro 32(3), May-Jun. 2012, 6 pages.

\* cited by examiner

TEXTURE STATE CACHE

BACKGROUND

Technical Field

This disclosure relates generally to graphics processing and more specifically to texture mapping.

Description of the Related Art

Texture mapping is a well-known graphics processing technique in which a texture is applied to the surface of an object to be displayed. Textures may indicate color and transparency of pixels corresponding to object surfaces, for example. Graphics programs typically include state information that may be used to access and apply a texture. The state information may include base address in memory, size, clamping parameters, filtering parameters, etc. Filtering parameters may indicate how to determine pixel attributes based on texels retrieved from the texture. State information for textures may be accessed relatively frequently during graphics shading.

SUMMARY

Techniques are disclosed relating to a cache configured to store state information that may be used to facilitate texture mapping. In one embodiment, a texture state cache includes a plurality of entries configured to store state information relating to one or more stored textures. In this embodiment, the texture state cache also includes texture processing circuitry configured to retrieve state information for one of the stored textures from one of the entries in the texture state cache and determine pixel attributes based on the texture and the retrieved state information. The state information may include texture state information and sampler state information, in some embodiments. The texture state information may indicate properties of the texture and/or be usable to access the texture based on received texture coordinates. The sampler state information may indicate how to determine pixel attributes based on texel information retrieved from the texture. The texture state cache may, in some embodiments, result in reduced rendering times and power consumption relative to implementations that do not include a cache for state information.

In one embodiment, the texture processing circuitry is configured to pipeline an index of the entry in the texture state cache but not the state information itself. In one embodiment, the texture state cache includes multiple read ports, such that multiple stages of the texture processing circuitry may access the cache at the same time. Entries in the texture state cache may be implemented using flip-flops and/or latches, in some embodiments. In one embodiment, tags for the texture state cache correspond to locations of corresponding state information in a shared memory. In some embodiments, entries in the texture state cache include a valid field, a pending counter, and/or a least-recently-used (LRU) field. In some embodiments, a graphics processor may include a texture cache for storing textures, in addition to the texture state cache.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1A:
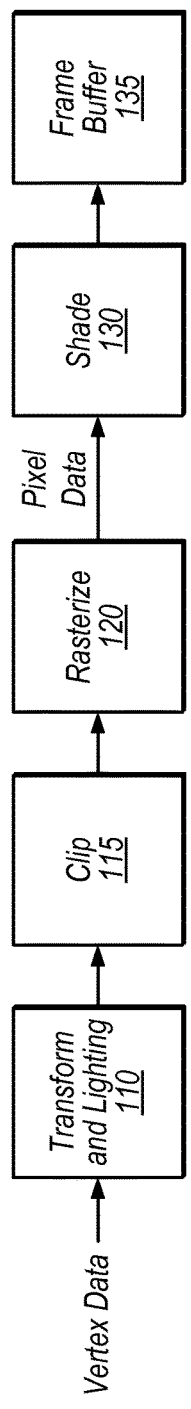
FIG. 1A is a block diagram illustrating an exemplary graphics processing flow.
Figure 1B:
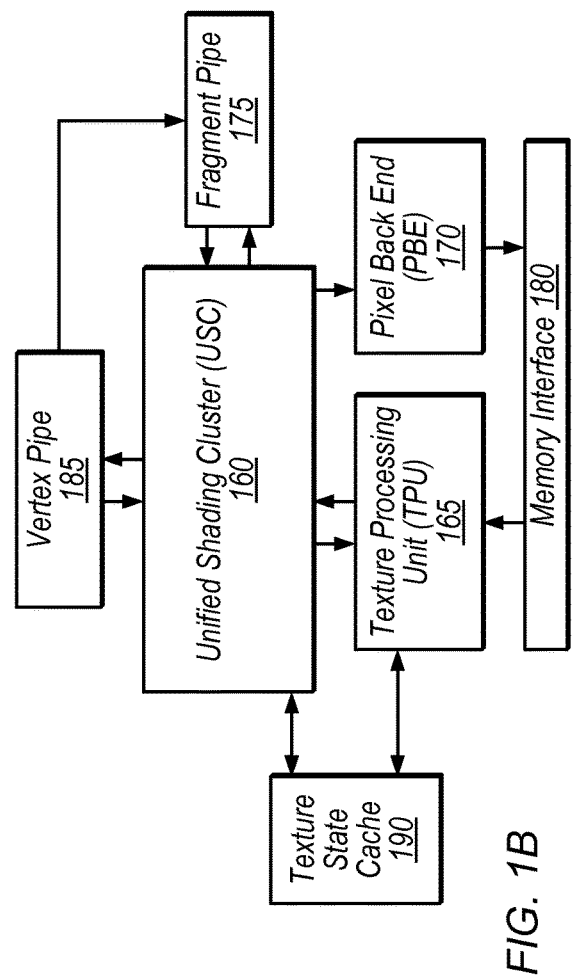
FIG. 1B is a block diagram illustrating one embodiment of a graphics unit.

This disclosure initially describes, with reference to FIGS. 1A-B, an overview of a graphics processing flow and an exemplary graphics unit. Embodiments of a graphic unit that includes a texture state cache are described in further detail with references to FIGS. 2-4 and an exemplary device is described with reference to FIG. 5. In some embodiments, the texture state cache may significantly reduce power consumption and/or improve shader performance.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 that includes a texture state cache is shown. In the illustrated embodiment, graphics unit 150 includes unified shading cluster (USC) 160, vertex pipe 185, fragment pipe 175, texture processing unit (TPU) 165, pixel back end (PBE) 170, memory interface 180, and texture state cache 190. In one embodiment, graphics unit 150 may be configured to process both vertex and fragment data using USC 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with USC 160 in order to coordinate vertex processing. In the illustrated embodiment, vertex pipe 185 is configured to send processed data to fragment pipe 175 and/or USC 160 for further processing.

Fragment pipe 175, in the illustrated embodiment, may include various fixed-function hardware configured to process pixel data. Fragment pipe 175 may be configured to communicate with USC 160 in order to coordinate fragment processing. Fragment pipe 175 may be configured to perform rasterization on polygons from vertex pipe 185 and/or USC 160 to generate fragment data. Vertex pipe 185 and/or fragment pipe 175 may be coupled to memory interface 180 (coupling not shown) in order to access graphics data.

USC 160, in the illustrated embodiment, is configured to receive vertex data from vertex pipe 185 and fragment data from fragment pipe 175 and/or TPU 165. USC 160 may be configured to perform vertex processing tasks on vertex data which may include various transformations and/or adjustments of vertex data. USC 160, in the illustrated embodiment, is also configured to perform fragment processing tasks on pixel data such as texturing and shading, for example. USC 160 may include multiple execution instances for processing data in parallel. USC 160 may be referred to as "unified" in the illustrated embodiment in the sense that it is configured to process both vertex and fragment data. In other embodiments, programmable shaders may be configured to process only vertex data or only fragment data.

TPU 165, in the illustrated embodiment, is configured to schedule fragment processing tasks from USC 160. In one embodiment, TPU 165 may be configured to pre-fetch texture data and assign initial colors to fragments for further processing by USC 160 (e.g., via memory interface 180). TPU 165 may be configured to provide fragment components in normalized integer formats or floating-point formats, for example. In one embodiment, TPU 165 may be configured to provide fragments in groups of four (a "fragment quad") in a 2×2 format to be processed by a group of four execution instances in USC 160.

PBE 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as USC 160 may be coupled in any of various appropriate configurations to other programmable and/or fixed-function elements in a graphics unit. The exemplary embodiment of FIG. 1B shows one possible configuration of a graphics unit 150 for illustrative purposes.

Exemplary Texture State Cache

In the illustrated embodiment of FIG. 1B, graphics unit 150 includes a texture state cache 190 configured to store state information for textures processed by TPU 165. Texture state cache 190 is described in further detail below with reference to FIGS. 2-3.

As used herein, the term "texture" refers to data that indicates characteristics of the surface of an object to be generated by a graphics processor for display. These characteristics may include color, transparency, etc. "Texture mapping" is a well-known graphics technique in which a texture is applied to the surface of a graphical element such as a shape or polygon. Textures may be "wrapped around" any of various 3-dimensional objects by mapping points in the objects to the texture.

Textures are typically represented by arrays of "texels" just as images are represented using arrays of pixels. Texels are typically the smallest unit of graphics element in texture space, and indicate red, green, blue, and alpha attributes in some embodiments. The alpha attribute may indicate various information in different embodiments; it is often used to indicate translucency. Often, graphics processors initially determine texture coordinates for vertices of a polygon and then interpolate to determine texture coordinates of individual pixels representing the surface of the polygon. When a calculated texture coordinate does not directly map to a texel, filtering rules may be used to determine pixel attributes based on nearby texels.

As used herein, "state information" refers to information indicative of properties of a texture and/or parameters for determining pixel information from the texture. State information is typically provided in a graphics program to be executed by graphics unit 150, along with textures for the graphics program. State information may be loosely grouped into two categories: "texture state" information that indicates characteristics or attributes of a given texture and "sampler state" information that indicates how data from a given texture is to be applied or processed when determining pixel attributes based on the texture (e.g., filtering rules are typically included in sampler state information). Note that some particular embodiments of state information may not fit precisely into either category or may fit into both categories. Specific embodiments of parameters for "texture state" data and "sampler state" data are defined in the OpenGL® standard, for example, as well as other graphical programming standards.

Examples of "texture state" information utilized in some embodiments include: base address, format, width, height, mipmap range, swizzle mapping, and/or stencil texturing, etc. For example, knowledge of the base address of a texture may be necessary to access the texture, e.g., the addresses of texels may be determined based on the base address and input texture coordinates. The format of a texture may indicate how the texture stores information (e.g., many bits are used to indicate each texel attribute). The format may be needed to correctly read the texture. The width and height may be used to determine whether a provided coordinate falls outside the texture. Swizzle maps may specify the channels used to indicate each texel attribute. The mipmap range may indicate one or more mipmaps that are available for the texture. Mipmaps are pre-generated images that are based on a texture, but typically include a reduced level of detail. Mipmaps may improve rendering performance, e.g., by accessing the mipmap rather than the texture when a texture is viewed at a distance. Thus, speaking generally, these examples of texture state information indicate characteristics of a stored texture and may be used to correctly access and retrieve data from the texture.

Examples of "sampler state" information utilized in some embodiments include: filter type, anisotropic filtering, level of detail (LOD) range and bias, comparison mode, edge value sampling, border color, etc. The filter type may indicate how to determine pixel attributes based on texels.

For example, magnification may be used when the area of a fragment in texture space is smaller than a pixel and minification may be used when the area of a fragment in texture space is larger than a texel. The filter type may indicate various operations to determine pixel attributes from a texture such as: use attributes from the nearest texel (often referred to as nearest-neighbor, which may be used with or without mipmaps), bilinear filtering in which attributes from four texels are combined using a weighted average, trilinear filtering in which multiple mipmap levels may be used to determine pixel attributes, and anisotropic filtering which may be used to enhance image quality of textures at oblique viewing angles. LOD range and bias may be used as inputs when determining which mipmap to access from among available mipmaps (while the mipmap range discussed above may indicate which mipmaps are available). Comparison mode may involve comparing an input value with a value retrieved from the texture and may indicate whether one or more pixels match the input value. Edge value sampling and/or border color may be used to determine pixel attributes for pixels that fall outside the texture. Thus, speaking generally, these examples of sampler state information indicate how to determine pixel attributes based on the texture.

Figure 2:
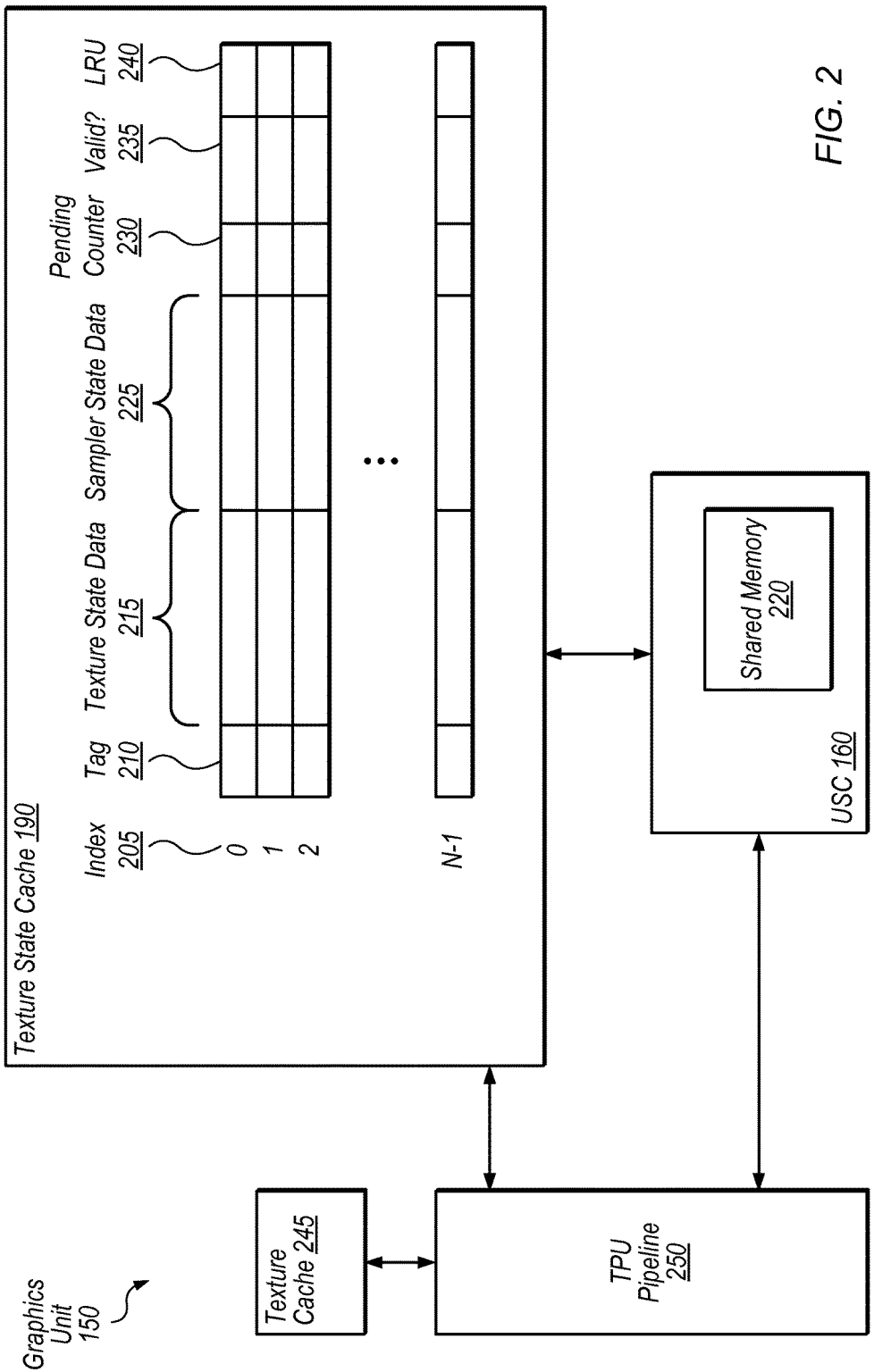
FIG. 2 is a block diagram illustrating one embodiment of a graphics unit that includes a texture state cache.

Referring to FIG. 2, one embodiment of graphics unit 150 that includes a texture state cache 190 is shown. In the illustrated embodiment, graphics unit 150 includes TPU pipeline 250 (described in further detail below with respect to FIG. 3), USC 160, texture cache 245, and texture state cache 190. USC 160, in the illustrated embodiment, includes shared memory 220. In various embodiments, shared memory 220, texture cache 245, and texture state cache 190 may be located in any of various appropriate blocks of graphics unit 150; these elements are shown in their respective location for illustrative purposes only.

Texture cache 245, in the illustrated embodiment, is configured to store textures. Some embodiments may not include a texture cache but may store textures in a memory. Texture cache 245 is included in a cache and/or memory hierarchy that may include multiple caches and/or multiple memories, in some embodiments. In various embodiments, texture data may be stored using a storage element (e.g., a cache or memory) that is distinct from one or more storage elements used to store state information for the corresponding texture.

Texture state cache 190, in the illustrated embodiment, is configured to store state information for stored textures using the texture state data 215 and sampler state data 225 fields. In the illustrated embodiment, texture state cache 190 includes N entries indexed 0 through N−1. In the illustrated embodiment, each entry includes a tag 210, texture state data 215, sampler state data 225, a pending counter 230, a valid bit 235, and a least-recently-used (LRU) field 240. In various embodiments, one or more illustrated fields may be omitted and/or additional fields may be included.

USC 160, in the illustrated embodiment, is configured to store state information in shared memory 220. The state information may be included in a graphics program provided by an application developer, for example. In this embodiment, when sending a texture command to TPU pipeline 250, USC 160 is configured to determine whether state information for the command is already stored in texture state cache 190. In the illustrated embodiment, tag 210 corresponds to the location of state information in shared memory 220. In this embodiment, USC 160 is configured to determine whether any entries in texture state cache 190 have a tag 210 that matches the location of the relevant state information in shared memory 220. If the state information is already present in texture state cache 190, in this embodiment, USC 160 is configured to transmit the index 205 of the matching entry with the texture command. If the state information is not present, in this embodiment, USC 160 is configured to allocate an entry in texture state cache 190 for the state information and transmit the index of the allocated entry with the texture command.

In many typical workloads TPU pipeline 250 will access a small number of unique texture state and/or sampler state values, which are stored using texture state cache 190 in the illustrated embodiment. Texture state cache 190 may allow TPU pipelines 250 to access state information more quickly and using less power relative to accessing the state information from shared memory 220.

In the illustrated embodiment, TPU pipeline 250 is configured to pipeline the index 205 with each TPU command received from USC 160. In this embodiment TPU pipeline 250 is configured to pass the index 205 from a given pipeline stage to the next throughout relevant stages of TPU pipeline 250, along with relevant portions of the TPU command. In some embodiments, texture state cache 190 is a relatively small cache (e.g., in the range of 2 to 64 entries). Thus, pipelining the index rather than the state information itself may reduce complexity and power consumption of TPU pipeline 250 in comparison to pipelining the entirety of the state information. For example, the index may include only a few bits while state information for a texture may include 256 bits or more, in some embodiments.

In some embodiments, entries in texture state cache 190 are implemented using only flops and/or latches to store the state information. Using flops and/or latches may be desirable for relatively small caches, and may facilitate designs with multiple read ports, compared to other implementation such as SRAM cells. In some embodiments, texture state cache 190 includes multiple read ports which are available to various pipeline states in TPU pipeline 250, allowing the different stages to access texture state cache 190 at the same time.

The portion of texture state cache 190 entries designated as pending counter 230, in some embodiments, is configured to indicate the number of pending operations for a given entry in texture state cache 190. In one embodiment, when sending a command that accesses an existing entry in texture state cache 190, USC 160 is configured to increment the pending counter 230 for the entry. In one embodiment, when creating a new entry, USC 160 is configured to set the pending counter 230 to one (e.g., for the command that resulted in creation of the new entry). In one embodiment, TPU pipeline 250 is configured to decrement the pending counter 230 when it is finished processing the command. Thus, a pending counter 230 of zero, in some embodiments, indicates that no commands that access that entry are currently pending in TPU pipeline 250. The pending counter 230 fields may be used to select victim entries when a new entry is needed, in some embodiments.

Texture state data 215, as explained in detail above with reference to the term "texture state," may include one or more of: base address, format, width, height, mipmap range, swizzle map, and/or stencil texturing, etc., in some embodiments.

Sampler state data 225, as explained in detail above with reference to the term "sampler state," may include one or more of: filter type, anisotropic filtering, level of detail (LOD) range and bias, comparison mode, edge value sampling, border color, etc., in some embodiments.

In the illustrated embodiment, each entry in texture state cache 190 includes both texture state and sampler state data. In other embodiments, each entry may be configured to store only texture state information or only sampler state information. In one embodiment, CPU 150 may include separate texture state caches or separate entries in the same texture state cache for texture and sampler state information.

In various embodiments, valid bit 235 may indicate whether data in a corresponding entry is valid or coherent. USC 160, in some embodiments, is configured to use the valid bit 235 to invalidate entries when an associated address in shared memory 220 is reallocated, which may indicate that the texture state cache 190 and shared memory 220 are no longer coherent.

LRU field 240, in one embodiment, is used to determine which entry to select as a victim when an entry for new state information is needed. Victim entries may be selected based on LRU field 240, valid bit 235, and/or pending counter 230, in various embodiments. In one embodiment, graphics unit 150 is configured to preferentially select a victim entry that has a pending counter 230 value of 0 and is invalid. In one embodiment, among entries with the same pending counter 230 and validity state, graphics unit 150 is configured to select a victim entry based on LRU field 240. In one embodiment, if all entries are valid and no entries have a pending counter 230 value of zero, USC 160 may stall sending commands to TPU pipeline 250 until one of the entries has a pending counter of zero. In this embodiment, USC 160 is not configured to evict a valid entry unless it has a pending counter 230 value of zero.

In one embodiment, USC 160 is configured to send state information to texture state cache using multiple cycles. In this embodiment, interface circuitry between USC 160 and texture state cache 190 may have a width that is smaller than a width (e.g., number of bits) of the state information. This may reduce wiring congestion and complexity, in some embodiments.

Figure 3:
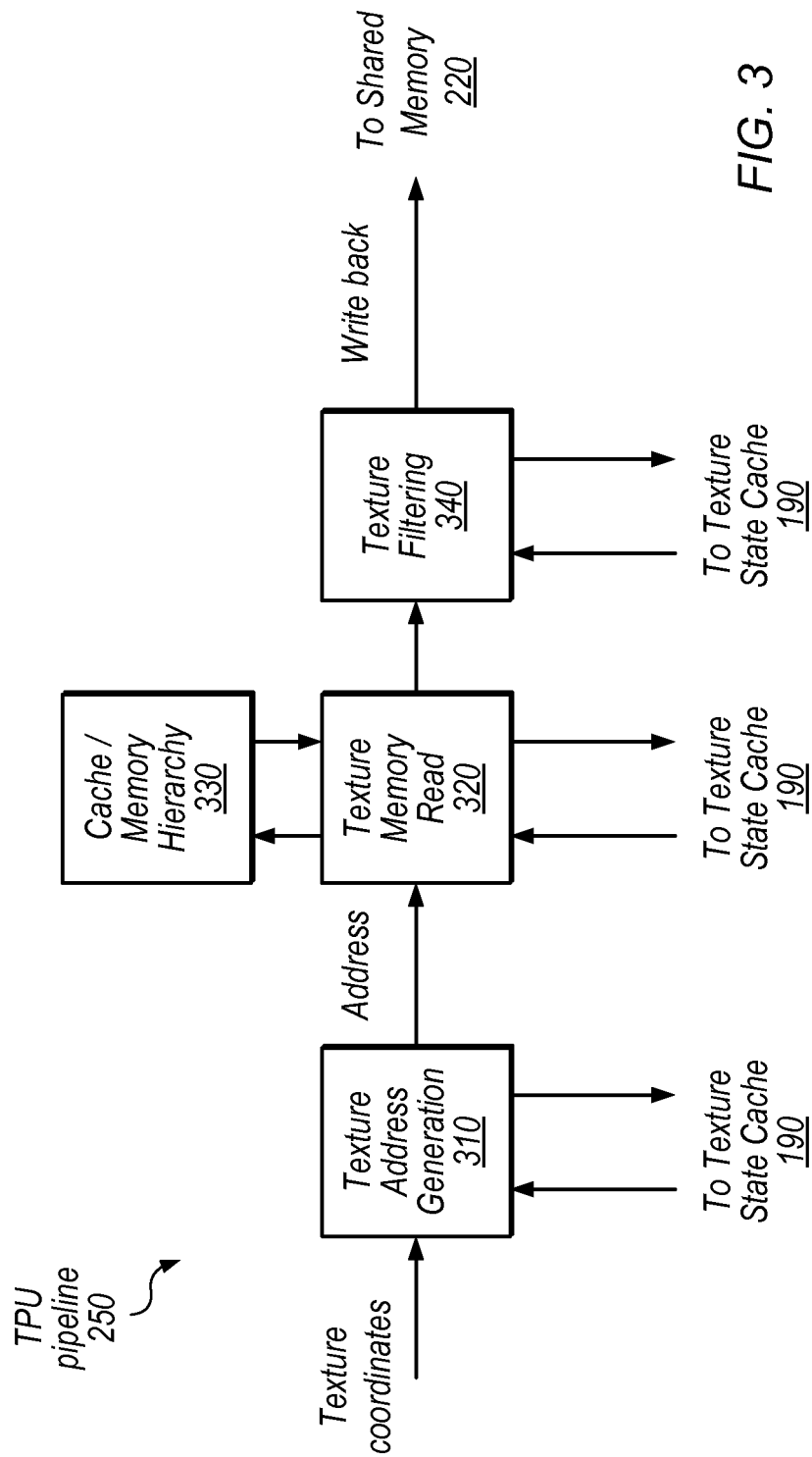
FIG. 3 is a block diagram illustrating one embodiment of a texture processing pipeline.

Referring now to FIG. 3, a block diagram illustrating one exemplary embodiment of TPU pipeline 250 is shown. TPU pipeline 250 is one embodiment of texture processing circuitry. In some embodiments, TPU 165 includes one or more such pipelines. In the illustrated embodiment, TPU pipeline 250 includes texture address generation stage 310, texture memory read stage 320, and texture filtering stage 340. In the illustrated embodiment, TPU pipeline includes and/or is coupled to elements of cache/memory hierarchy 330. The pipeline shown FIG. 3 is exemplary only; in other embodiments texture processing pipelines may include any of various appropriate pipeline stages.

Cache/memory hierarchy 330, in various embodiments, may include multiple levels of caches and/or memories configured to store texture data and/or other types of data. Thus, in some embodiments, graphics unit 150 includes one or more texture caches. Note that a texture cache is distinct from texture state cache 190. A texture cache, in these embodiments, is configured to store texture data itself while texture state cache 190 is configured to store state information about the stored texture. Note that state information may generally be stored separately from a corresponding texture (rather than being stored in a texture cache with the texture itself) because the state information may be needed to access the texture at all (e.g., by specifying its base address) and may vary for a given texture within a graphics program.

Texture address generation stage 310, in the illustrated embodiment, is configured to receive texture coordinates and generate a texture address. The texture coordinates may be received as part of a texture command. The texture command may include the index of an entry in texture state cache 190. In some embodiments, texture address generation stage 310 is configured to generate the texture address from the texture coordinates based on state data 215 in texture cache 190. For example, the texture address may be based on a base address of the texture included in texture state data 215.

Texture memory read stage 320, in the illustrated embodiment, is configured to access a texture in cache/memory hierarchy 330 and retrieve relevant data. Texture memory read stage 320 may retrieve information for texels based on the texture address from stage 310, for example. Texture memory read stage 320, in the illustrated embodiment, is configured to access state information stored in texture state cache 190.

Texture filtering stage 340, in the illustrated embodiment, is configured to determine fragment or pixel attributes based on the retrieved texture information. This stage may apply various filtering techniques, which may be determined based on sampler state data 225 in texture state cache 190. For example, when texture coordinates fall between texels, texture filtering stage 340 may determine which texels to use and/or blend to determine pixel attributes (e.g., red, green, blue, and/or alpha attributes). In the illustrated embodiment, texture filtering stage 340 is configured to write back results of texture sampling instructions to shared memory 220 for further processing and/or display. Texture filtering stage 340, in one embodiment, is configured to decrement a pending counter 230 in response to completion of a corresponding texture operation.

In some embodiments, TPU pipeline 250 is configured to pipeline an index to texture state cache 190 rather than pipelining state information. This may reduce power consumption and complexity. In embodiments in which texture state cache 190 includes multiple write ports, multiple stages of TPU pipeline 250 may be configured to read state information from texture state cache 190 in the same cycle.

Figure 4:
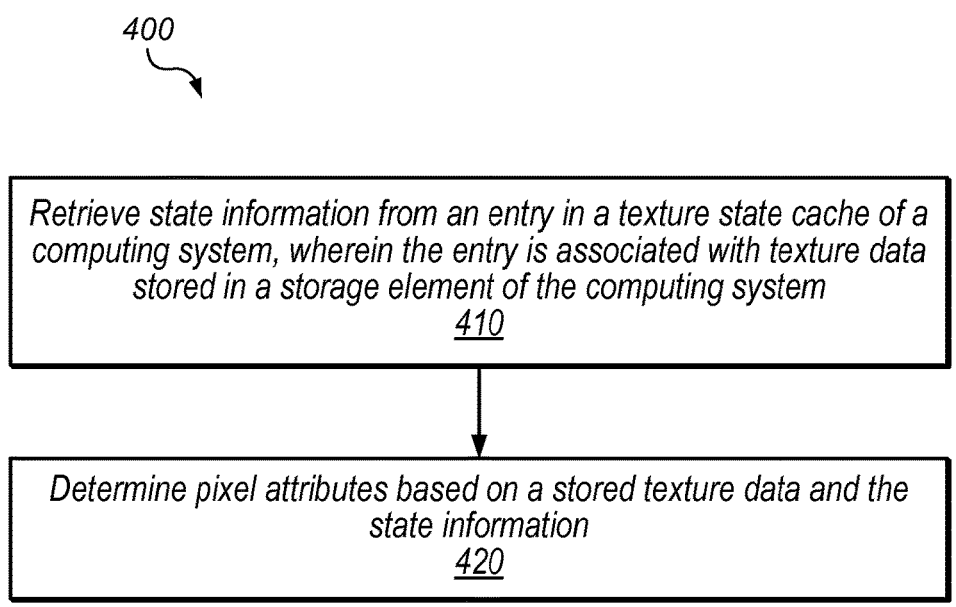
FIG. 4 is a flow diagram illustrating one embodiment of a method for texture sampling using a texture state cache.

Referring now to FIG. 4, a flow diagram illustrating one exemplary embodiment of a method 400 utilizing a texture state cache is shown. The method shown in FIG. 4 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 410.

At block 410, state information is retrieved from an entry in a texture state cache. In this embodiment, the entry is associated with texture data stored in a storage element of a computing system (e.g., a texture cache). In one embodiment, TPU pipeline 250 is configured to retrieve the state information using an index provided by USC 160. In one embodiment, USC 160 is configured to copy the state information from shared memory 220 to texture state cache 190 before sending a command with the index to TPU pipeline 250. Flow proceeds to block 420.

At block 420, pixel attributes are determined based on a stored texture data and the state information. In one embodiment, TPU pipeline 250 is configured to determine how to access the stored texture based on the state information and how to determine pixel attributes based on data accessed from the texture based on the state information. Flow ends at block 420.

Figure 5:
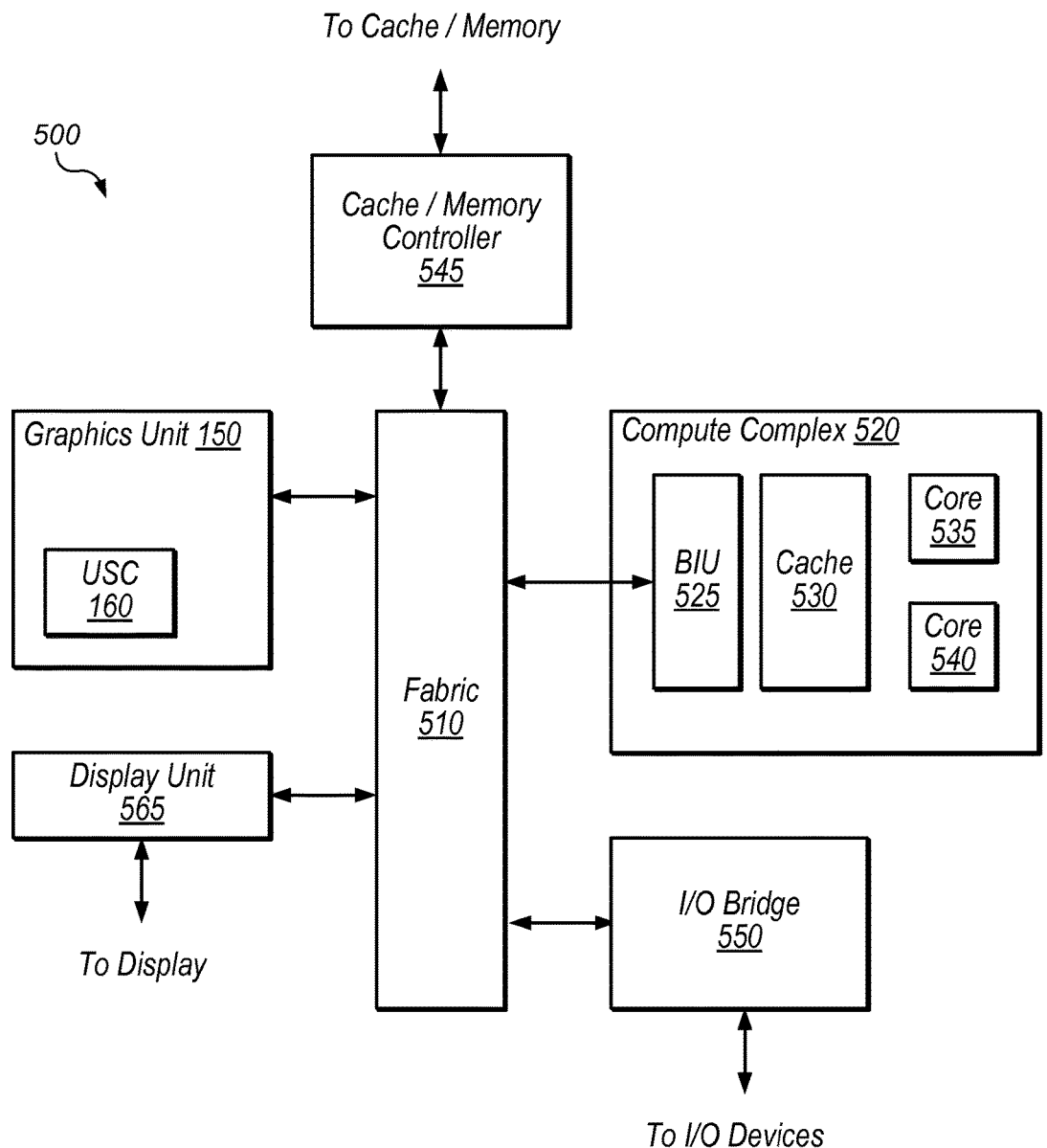
FIG. 5 is a block diagram illustrating one embodiment of a device that includes a graphics unit.

Referring now to FIG. 5, a block diagram illustrating an exemplary embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520, input/output (I/O) bridge 550, cache/memory controller 545, graphics unit 150, and display unit 565.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. In various embodiments, compute complex 520 may include various numbers of cores and/or caches. For example, compute complex 520 may include 1, 2, or 4 processor cores, or any other suitable number. In one embodiment, cache 530 is a set associative L2 cache. In some embodiments, cores 535 and/or 540 may include internal instruction and/or data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

Cache/memory controller 545 may be configured to manage transfer of data between fabric 510 and one or more caches and/or memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 150 may be described as "coupled to" a memory through fabric 510 and cache/memory controller 545. In contrast, in the illustrated embodiment of FIG. 5, graphics unit 150 is "directly coupled" to fabric 510 because there are no intervening elements.

Graphics unit 150 may be configured as described above with reference to FIGS. 1B-4. Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes USC 160.

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and/or low-power always-on functionality, for example. I/O bridge 550 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 550.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a texture state cache with multiple read ports that includes a plurality of entries configured to store state information relating to one or more textures stored by the apparatus, wherein the state information includes sampler state information that indicates how to process retrieved texel information to determine pixel attributes for texture samples; and
   texture processing circuitry configured to retrieve state information for a particular one of the stored textures from one of the plurality of entries in the texture state cache and to determine pixel attributes based on the particular texture and retrieved state information;
   wherein the texture processing circuitry includes a pipeline that includes multiple stages, including at least texture address generation, texture memory access, and texture filtering stages that are configured to access state information in the texture state cache in the same cycle using different respective ones of the multiple read ports.

2. The apparatus of claim 1, wherein the state information further includes texture state information that indicates properties of the particular texture and is usable to access the particular texture based on received texture coordinates.

3. The apparatus of claim 1, wherein the sampler state information specifies a filtering mode for sample operations.

4. The apparatus of claim 3, wherein the filtering mode includes at least one of: nearest-neighbor, bilinear, or anisotropic.

5. The apparatus of claim 1, wherein entries in the texture state cache are implemented using at least one of flip-flops and latches.

6. The apparatus of claim 1, further comprising:
a shared memory;
wherein each of the plurality of entries in the texture state cache is associated with a respective tag, wherein the tag corresponds to a location, in the shared memory, of state information stored in the entry.

7. The apparatus of claim 6, wherein each of the plurality of entries includes a valid field, wherein the apparatus is configured to indicate that an entry of the plurality of entries is invalid in response to modification of a corresponding location in the shared memory.

8. The apparatus of claim 1, further comprising:
a texture cache configured to store the one or more textures.

9. The apparatus of claim 1, further comprising:
a pending counter associated with each of the plurality of entries;
wherein the apparatus is configured to:
send a texture operation to the texture processing circuitry, wherein the texture operation indicates an entry of the texture state cache;
increment a pending counter for the entry in response to sending the texture operation; and
decrement the pending counter in response to completion of the texture operation.

10. The apparatus of claim 9, wherein the apparatus is configured to select a victim entry of the texture state cache to store new state information based on one or more of the pending counters.

11. The apparatus of claim 1, further comprising:
interface circuitry between a shared memory and the texture state cache, wherein the apparatus is configured to transfer state information to the texture state cache via the interface circuitry, wherein the interface circuitry has a width that is smaller than a width of the state information, and wherein the apparatus is configured to transfer state information for an entry in the texture state cache over multiple cycles.

12. A method, comprising:
retrieving, by a texture processing pipeline, state information from an entry in texture state cache circuitry that includes multiple read ports, wherein the state information includes sampler state information that indicates how to process retrieved texel information to determine pixel attributes for texture samples, wherein the entry in the texture state cache circuitry is associated with texture data stored in a storage element; and
processing, by the texture processing pipeline, the stored texture data based on the state information to determine pixel attributes for display;
wherein the texture processing pipeline includes multiple stages including at least texture address generation, texture memory access, and texture filtering stages that are configured to access state information in the texture state cache circuitry in the same cycle using different respective ones of the multiple read ports.

13. The method of claim 12, wherein the sampler state information specifies a filtering mode for sample operations.

14. The method of claim 12, further comprising:
receiving a texture command that includes an index of the entry; and
passing the index via a plurality of stages of the texture processing pipeline;
wherein the retrieving is performed for multiple ones of the plurality of stages.

15. The method of claim 12, wherein the state information includes at least one of: base address, width, height, mipmap information, swizzle information, stencil texturing information, filter type, anisotropic filtering information, level of detail information, comparison mode information, edge value information, and border color information.

16. The method of claim 12, wherein the sampler state information specifies one or more levels of detail.

17. An apparatus, comprising:
a texture cache configured to store a plurality of textures for graphics processing;
a texture state cache comprising a plurality of entries each configured to store state information for one or more of the plurality of textures, wherein the state information includes sampler state information that indicates how to process retrieved texel information to determine pixel attributes for texture samples and wherein the texture cache includes multiple read ports;
texture processing circuitry configured to:
retrieve sampler state information from an entry of the texture state cache;
retrieve texture information from the texture cache based on the state information; and
determine pixel attributes based on the sampler state information and the texture information;
wherein the texture processing circuitry includes a pipeline that includes multiple stages including at least texture address generation, texture memory access, and texture filtering stages that are configured to access state information in the texture state cache in the same cycle using different respective ones of the multiple read ports.

18. The apparatus of claim 17, further comprising:
a shared memory; and
control circuitry configured to:
determine, by comparing a location of the state information in the shared memory to tag values of the plurality of entries, that the state information is not currently stored in the texture state cache;
store the state information in the entry; and
transmit a command to the texture processing circuitry that includes an index of the entry.

* * * * *